US012607022B2

(12) United States Patent
Baert et al.

(10) Patent No.: US 12,607,022 B2
(45) Date of Patent: Apr. 21, 2026

(54) DECORATIVE PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 18/710,825

(22) PCT Filed: Nov. 16, 2022

(86) PCT No.: PCT/EP2022/082158
§ 371 (c)(1),
(2) Date: May 16, 2024

(87) PCT Pub. No.: WO2023/088975
PCT Pub. Date: May 25, 2023

(65) Prior Publication Data
US 2025/0003238 A1 Jan. 2, 2025

(30) Foreign Application Priority Data
Nov. 16, 2021 (NL) ...................................... 2029766

(51) Int. Cl.
*B32B 3/12* (2006.01)
*B32B 3/04* (2006.01)
(Continued)

(52) U.S. Cl.
CPC .............. *E04F 15/107* (2013.01); *B32B 3/04* (2013.01); *B32B 3/06* (2013.01); *B32B 3/12* (2013.01); *B32B 27/304* (2013.01); *B32B*

37/24 (2013.01); *E04F 15/02038* (2013.01); *B32B 2037/243* (2013.01); *B32B 2255/10* (2013.01);
(Continued)

(58) Field of Classification Search
CPC .... B32B 3/06; B32B 3/10; B32B 3/18; B32B 3/20; B32B 3/22; B32B 3/26; B32B 3/30; B32B 3/085; B32B 2491/04; B32B 2471/00; E04F 15/107
See application file for complete search history.

(56) References Cited

U.S. PATENT DOCUMENTS

2024/0246316 A1* 7/2024 Boucké ................... E04F 13/18

FOREIGN PATENT DOCUMENTS

| CN | 102124171 A | 7/2011 |
| EP | 1128713 A1 | 8/2001 |
| EP | 2154312 A1 | 2/2010 |

OTHER PUBLICATIONS

International Search Report and Written Opinion issued in PCT/EP2022/082158 and mailed Feb. 10, 2023.

* cited by examiner

*Primary Examiner* — Elizabeth E Mulvaney
(74) *Attorney, Agent, or Firm* — Heslin Rothenberg Farley & Mesiti P.C.

(57) ABSTRACT

The invention relates to a decorative panel, in particular a floor panel, the panel comprising a core layer, the core layer comprising an upper core surface and a bottom core surface and at least two pairs of opposing side edges, a decorative layer and a conductive layer, wherein the conductive layer is at least partially enclosed between the core layer and the decorative layer.

20 Claims, 2 Drawing Sheets

(51) Int. Cl.

| | |
|---|---|
| *B32B 3/06* | (2006.01) |
| *B32B 27/30* | (2006.01) |
| *B32B 37/24* | (2006.01) |
| *E04F 15/02* | (2006.01) |
| *E04F 15/10* | (2006.01) |

(52) U.S. Cl.

CPC ..... *B32B 2307/202* (2013.01); *B32B 2451/00* (2013.01); *B32B 2607/00* (2013.01); *E04F 2201/023* (2013.01); *E04F 2201/043* (2013.01); *E04F 2290/048* (2013.01)

DECORATIVE PANEL

CROSS REFERENCE TO RELATED APPLICATIONS

This application is a U.S. National Phase filing under 35 U.S.C. § 371 of International Application No. PCT/EP2022/082158, filed Nov. 16, 2022, and published as WO 2023/088975 A1 on May 25, 2023. PCT/EP2022/082158 claims priority from Netherland patent application No. 2029766, filed Nov. 16, 2021. The entire contents of each of these prior applications are hereby incorporated herein by reference.

The invention relates to a decorative panel. The invention also relates to an assembly of at least one panel according to the present invention and a grounding system. The invention further relates to a method of manufacturing a decorative panel.

BACKGROUND

Static electricity is an electric charge generated by the frictional contact of two surfaces which are made of materials that have different electrical characteristics. Changes in frictional contact occur due to any action between said surfaces, such as initiating a physical contact or a separation. When these materials initially come into contact, they form an electrical bond; when they are again separated the electrical bond is broken and, since they have different electrical characteristics, one material will lose electrons easier than the other. This creates an electrical imbalance in both materials: the material that loses electrons becomes positively charged, while the material that gains electrons becomes negatively charged. This process is commonly called static electricity generation or tribo-electrification. The polarity and charge of the materials is determined by the relative properties of the two materials as well as environmental conditions such as humidity. Materials that generally become negatively charged (gain electrons) include plastics such as polyvinylchloride (PVC), polystyrene (PS) and polyethylene (PE). Materials that typically become positively charged include for example leather, nylon, glass, skin or aluminium.

In the hard surface flooring industry, there has been a notable increase in recent years in the use of plastics such as PVC, polypropylene (PP), polyethylene terephthalate (PET), polyurethane (PU) and the like. Floorings using said materials are typically referred to as resilient floorings. When walked upon, the friction between shoe soles and the floor surface typically generates a static charge. Resilient flooring can therefore be responsible for build-up of static charges or electrostatic potential. Walking over a vinyl floor can for example cause the generation of a charge of up to 12 kV. When this electrostatic potential is not discharged, it will typically attracts dust particles. This can be highly undesired in specific environments, such as in areas which need to be clean, dust-free and/or sterile, such as medicinal spaces or cleanrooms. The discharge of electrostatic potential (ESD) may cause discomfort to humans and malfunction of and/or damage to sensitive electronic equipment, its internal circuitry and components. When a discharge occurs in an environment containing flammable and/or explosive materials such as dust, the spark created during the discharge can even cause dangerous situation leading to for example fire and/or explosions.

It is known in the flooring industry to attempt to prevent discharge of electrostatic potential by means of a staticprotective floor or "ESD floor". Such known ESD floors typically comprise conductive elements such as carbon, graphite or metal-coated particles distributed throughout the flooring material. This creates a pathway for the discharge from the walking surface (where the charge is typically generated) to a substrate underneath said floor. An example of a known solution is a homogeneous conductive vinyl tile comprising carbon particles embedded through the entire tile such that the particles create an electrical pathway to the substrate. Such ESD tile is then installed on an electrically conductive underlayment, such as conductive metal foils or an adhesive loaded with further conductive elements. Copper grounding strips attached to the underlayment are then connected to a grounding rod. When the floor becomes electrically charged, the charge will follow the path of least resistance and flow into the substrate.

There are some drawbacks for the use of the abovementioned ESD tiles. The installation of ESD tiles is complex and costly as it requires a large investment into an entire system comprising grounding rods to channel static charge into the substrate. This results in that it is generally not a feasible option for the general public or residential use where budget and/or the technical installation can be a restraint.

It is a goal of the present invention to provide a solution for obtaining a static dissipative or conductive floating floor comprising multiple individual tiles, preferably featuring an interlocking mechanism, that has design features reducing the maximum electrostatic charge the flooring can hold, and allowing discharge of electrostatic potential, while it is still relatively easy to install.

SUMMARY OF THE INVENTION

The invention provides thereto a decorative panel, in particular a floor panel (or wall panel or ceiling panel) for forming a floor covering, the panel comprising:

- at least one core layer, the core layer comprising an upper core surface and a bottom core surface and at least two pairs of opposing side edges;
- at least one decorative layer, in particular a decorative top layer; and
- at least one conductive layer, wherein the conductive layer is at least partially enclosed between at least part of the at least one core layer and at least part of the at least one decorative layer;
- wherein preferably at least part of at least one side edge (of the core layer) comprises at least one conductive structure which at least extends between the conductive layer and the bottom core surface of the core layer.

BRIEF DESCRIPTION OF THE FIGURES

The invention will be further elucidated by means of non-limiting exemplary embodiments illustrated in the following figures, in which:

FIG. 2b shows a cross section of the panel as shown in FIG. 2a.

Within these figures, similar reference numbers correspond to similar or equivalent elements or features.

DETAILED DESCRIPTION

Figure 1:
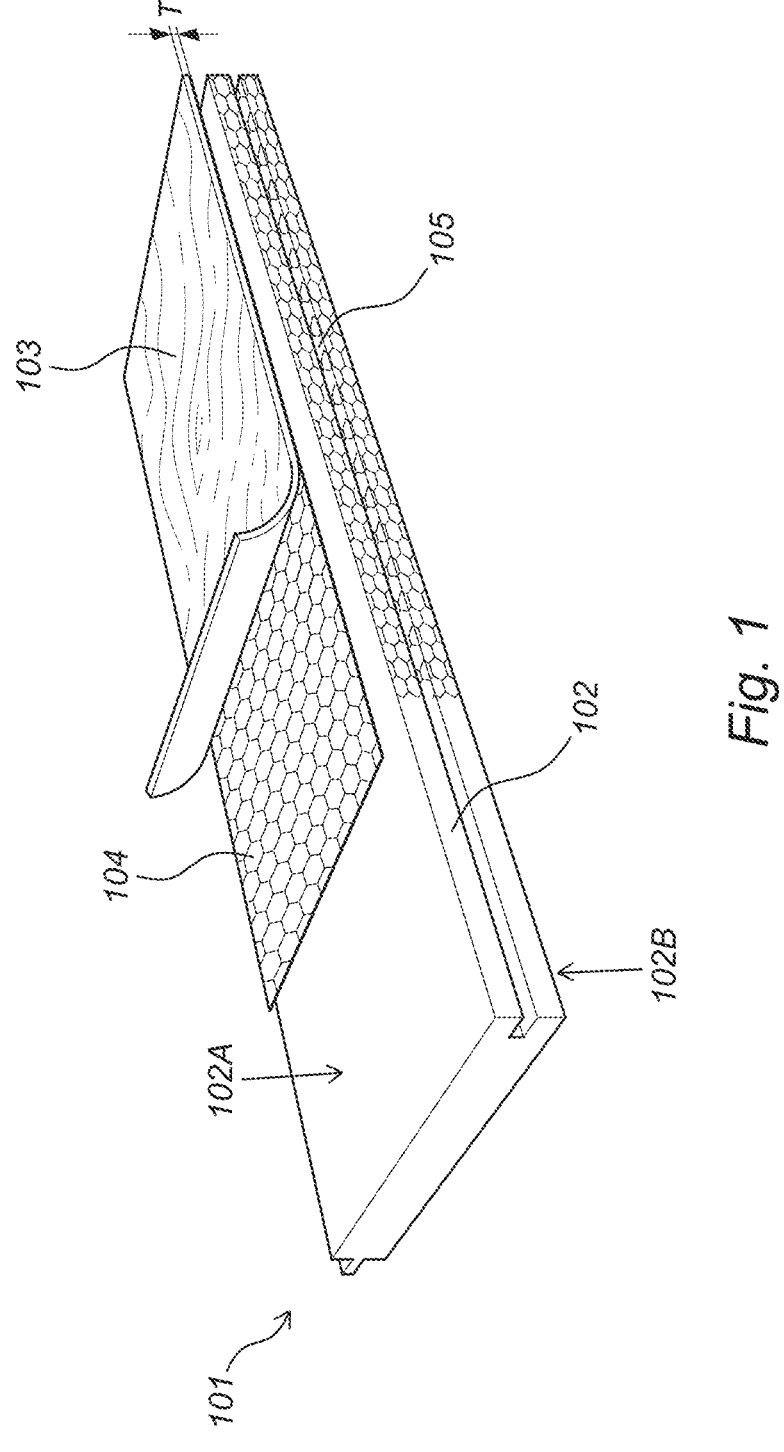
FIG. 1 shows a perspective view of a possible embodiment of a decorative panel according to the present invention.

FIG. 1 shows a perspective view of a schematic representation of a possible embodiment of a flooring panel 101 according to the present invention. The decorative panel 101 comprises a core layer 102, the core layer comprising an upper core surface 102A and a bottom core surface 102B and at least two pairs of opposing side edges. The panel 101 further comprises a decorative layer 103 and a conductive layer 104. The conductive layer 104 is enclosed between the core layer 102 and the decorative layer 103. At least one side edge of the core layer 102 comprises a conductive structure 105. Said conductive structure 105 extends between the conductive layer 104 and the bottom core surface 102B of the core layer 102. In the shown embodiment, both the conductive layer 104 and the conductive structure 105 comprise conductive particles which define a repeated pattern. In the shown embodiment the conductive particles define a cell structure, in particular a honeycomb cell structure. The conductive layer and the at least one conductive structure are preferably mutually connected. such. The conductive layer 104 is positioned within a predetermined distance from the top surface of the panel 101. In the shown embodiment, said distance is defined by the thickness T of the decorative layer 103. A preferred embodiment is designed such that the conductive layer 104 is position within 0.7 mm from a top surface of the panel 101.

Figure 2A:
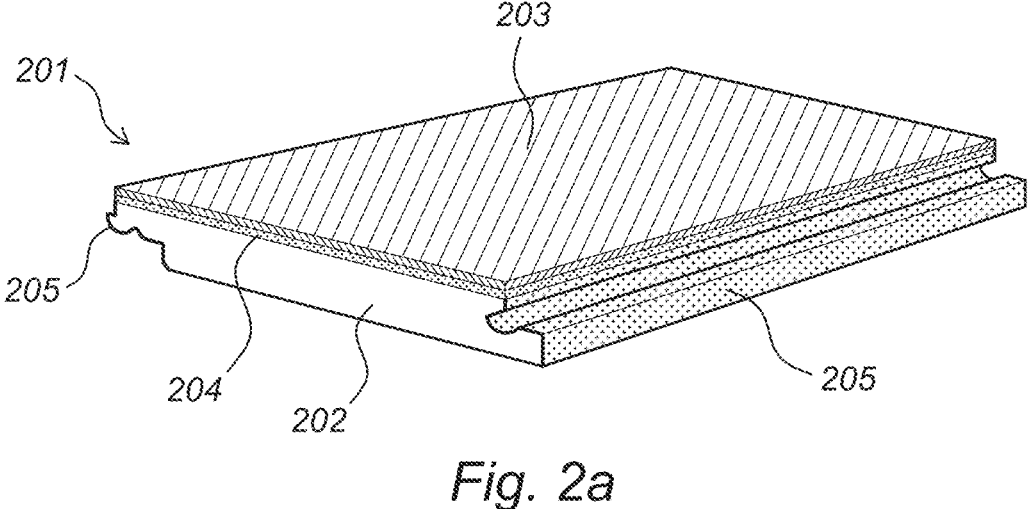
FIG. 2a shows a perspective view of a further embodiment of a decorative panel according to the present invention.
Figure 2B:
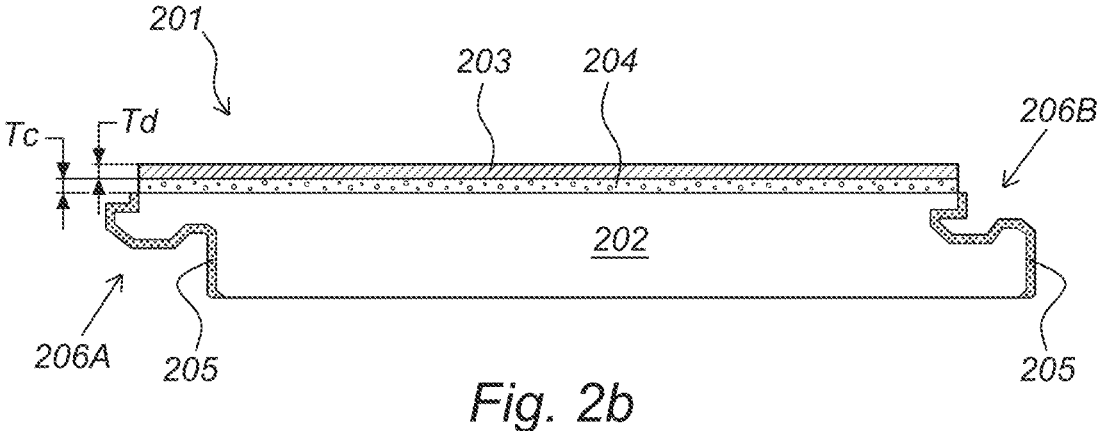

FIG. 2a shows a perspective view of further possible embodiment of a flooring panel 201 according to the present invention. FIG. 2b shows a cross section of the panel 201 as shown in FIG. 2a. The panel 201 comprises a core layer 202, a decorative layer 203 and a conductive layer 204. The conductive layer 204 is situated between the core layer 202 and the decorative layer 203. The conductive layer 204 is in the shown embodiment made of a sheet material. The side edges of the core layer 202 comprises a conductive structure 205. Said conductive structure 205 extends between the conductive layer 204 and the bottom core surface of the core layer 202. In the shown embodiment, a first pair of opposite side edges is provided with interconnecting coupling parts 206A, 206B for interconnecting adjacent panels 201. Said side edges, including said coupling parts 206A, 206B are in the shown embodiment coated with a conductive material such that a conductive structure 205 is formed. The conductive structures 205 are connected with, or at least engage, the conductive layer 204. The thickness Td of the decorative layer 203 is preferably maximized to ensure a good discharge of electrostatic potential. The thickness Tc of the conductive layer 204 can be relatively thin. The same applies for the thickness of the conductive structures.

The panel according to the present invention has several technical benefits. At first, the decorative panel according to the present invention reduces the maximum electrostatic charge which the floor covering formed by a plurality of panels according to the present invention can hold. The use of the combination of a conductive layer which is at least partially enclosed between the core layer and the decorative layer and the presence of at least one conductive structure provided at at least part of the a side edge of the panel allows discharge of electrostatic potential in an effective manner. The presence of at least one conductive structure provided at least part of at least one side edge, which conductive structure at least extends between the conductive layer and the bottom core surface of the core layer enables controlled discharge of electrostatic potential. It was experimentally found that the panel according to the present invention can even reduce the electrostatic charge buildup to below 2 kV, an possibly even below 0.2 kV. The panel according to the present invention further achieves that the time needed for static to dissipate is relatively low. The static decay of the panel can be in the millisecond range. The combination of a conductive layer and at least one conductive structure enables that a conventional core layer can be applied. A core layer would typically need a conductive filler content of up to 50% to allow a continuous conductive path to the substrate underneath it. Further, it is a challenge to obtain sufficient distribution of conductive particles throughout the core layer. Hence, the solution according to the present invention is beneficial from manufacturing point of view but also cost wise. A further benefit of the panel according to the present invention is that there is basically no compromising on aesthetics. Due to the panel comprising a decorative layer, in particular a decorative top layer, which typically fully covers the conductive layer and core layer, the panel can have a conventional, attractive, appearance. ESD tiles according to the prior art have due to their homogeneous nature restraints with regard to their decorative aspects. Also visible conductive material may negatively affect the aesthetic appearance of a tile. The upper surface of the decorative layer of the panel according to the present invention, and thus the top surface of the panel as such, is in particular free of conductive material.

The relatively simple configuration of the panel according to the present invention enables that the panel is installable by the user and does not require installation by a trained professional. Additionally, the panel according to the present invention is relatively simple to produce. This results in a panel which is affordable and installable by a layman, and still features a surface that is not so conductive as to cause a safety hazard to its users.

The conductive structure can also be referred to as (static) discharge channel. The conductive structure basically forms a conductive track between the conductive layer and the bottom core surface of the core layer. At least one conductive structure typically at least extends between the conductive layer and the bottom core surface of the core layer. In this way a substantially direct connection or pathway between the conductive layer and a substrate or conductive underlayer (whereupon the panel is positioned) can be obtained. Typically, at least one conductive structure extends over substantially the entire height of at least one side edge of the core layer. This enables that the panel is easily connectable to a grounding system and/or a (slightly) conductive underfloor. The layers of the floor panel are typically mutually attached. The panel can also be referred to as a laminated floor panel. The core layer could also be referred as core, carrier, carrier layer or carrier plate.

In a preferred embodiment, at least one pair of opposite side edges of the core layer is provided with complementary coupling parts. Yet in a further preferred embodiment, at least one and preferably each pair of opposite side edges is provided with complementary coupling parts. Hence, it is conceivable that at least one conductive structure is provided upon at least part of a coupling part. The complementary coupling parts, if applied, are typically configured for interconnecting adjacent panels. For example, the core layer comprises at least one pair of complementary coupling parts on at least two of its opposite side edges. Said coupling parts may for example be interlocking coupling parts configured for mutual coupling of adjacent panels on multiple directions. Preferably, said interlocking coupling parts provide locking in both horizontal and vertical directions. Any suitable interlocking coupling parts as known in the art could be applied. For example, said interlocking coupling parts may be in the form of complementary tongue and groove, male and female receiving parts, a projecting strip and a recess configured to receive said strip or any other suitable form. It is conceivable the complementary coupling parts require a downward scissoring motion when engaging, or are locked together by means of a horizontal movement. It is further conceivable that the interconnecting coupling mechanism comprise a tongue and a groove wherein the tongue is provided on one side edge of one pair of opposite side edges, and the groove is provided on the other side edge, or an adjacent side relative to that of the tongue, of the same pair of opposite side edges. Such a design of coupling mechanism is well-known in the art and has proven highly suitable for panels for floor coverings such as a floating floor. In a further embodiment it is possible that the inter-connecting coupling mechanism have an interlocking fea-ture which prevents interconnected panels from any free movement (play). Such an interlocking feature may be a projection and a respective recess provided on the respective opposite side edges by which neighboring panels interlock with each other. It is conceivable for provisions of reinforce-ment in the interlocking coupling parts to improve strength and prevent breakage thereof during installation of the panels. For example, the complementary or interlocking coupling parts may be reinforced with materials such as but not limited to fiberglass mesh, reinforcing sheets, ceramics, glass, arrays of non-metallic rods, or polymer compounds integrally formed in the core layer. It is also conceivable that a strengthening coat layer of micro or nanotechnology is added on the surface of the interlocking coupling parts. In case such coating is applied, the at least one conductive structure is applied upon said coating.

It is preferred that the resistivity of at least one conductive structure is at most $10^-4$ Ohm meter ($\Omega \cdot m$). It is also conceivable that the surface conductivity of at least one conductive structure is at most $0.9*10^-4$ $\Omega \cdot m$, preferably $0.8*10^-4$ $\Omega \cdot m$, more preferably $0.75*10^-4$ $\Omega \cdot m$.

At least one conductive structure is preferably connected with or to the at least one conductive layer. It is also conceivable that the conductive structure(s) is positioned in the proximity of the conductive layer without being directly into contact. It is also conceivable that at least one conduc-tive structure engages the conductive layer. In the described embodiments, the discharge of electrostatic potential can be further controlled in an efficient manner. The mutual co-action between the conductive layer and at least one con-ductive layer can be improved when both features are mutually connected or at least in each others proximity. In case multiple conductive structure are applied, it is benefi-cial to have each conductive structure to be connected with or to the at least one conductive layer. This can positively contribute to divided discharge of electrostatic potential. It is also conceivable that the multiple conductive structures are mutually connected.

In a preferred embodiment, at least one conductive struc-ture covers at least part of the surface of at least one side edge. This is beneficial as a clear pathway for the discharge of electrostatic potential is created. It is conceivable that the panel is designed such that one side edge of each pair of side edges is provided with at least one conductive structure. In this way, a plurality of panels (inter) connected panels will be provided with conductive structures between adjacent panels in an efficient configuration. It is also conceivable that the conductive structures are designed such that con-ductive structures of adjacent, coupled panels do not over-lap. The conductive structures of adjacent panels may for example be substantially aligned with another.

In a preferred embodiment, the conductive structure may comprise at least one conductive additive and/or at least one conductive particle, preferably a plurality of conductive particles. It is conceivable that at least part of the conductive structure is (at least partially) formed by a plurality of conductive particles which are attached to at least one side edge. The plurality of conductive particles may be mutually interconnected. The plurality of conductive particles may for example form an interconnected network of conductive particles. In this way the discharge of electrostatic potential can be further guided via a created pathway within the interconnected network of conductive particles. It is also conceivable that at least part of the conductive particles are attached onto at least part of the surface of the interlocking mechanism, if applied. It is imaginable that the side edge(s) of the decorative layer is free of conductive material.

In a further preferred embodiment, at least one conductive structure comprises a composite material comprising at least one matrix material and a plurality of conductive particles. Preferably, the composite material comprises at least 5 wt % conductive particles, more preferably at least 15 wt % conductive particles and most preferably at least 25 wt % conductive particles. It is also conceivable that at least one conductive structure comprises a composite material com-prising at least one matrix material and at least one conduc-tive material, wherein the composite material preferably comprises at least 5 wt % conductive material, more pref-erably at least 15 wt % conductive material and most preferably at least 25 wt % conductive material. At least part of the conductive particles and/or at least part of the con-ductive material may comprise carbon, graphite and/or metal. It is for example conceivable that the conductive material applied is carbon powder. It is also conceivable that at least part of the conductive particles comprise amorphous carbon black. In case amorphous carbon black is applied, it is preferred that said material is produced from heavy petroleum or vegetable oil. The concentration or ratio of conductive particles in the composite material is preferably higher than the percolation threshold. The percolation threshold is the ratio or concentration at which the conduc-tive particles start forming continuous conducting networks in the composite material. In the case of traditional conduc-tive particles such as carbon black, the threshold is only achievable at a ratio of 10 to 50% by weight. Some con-ductive particles such as carbon nanotubes have a lower percolation threshold.

In case at least one conductive structure comprises a plurality of conductive particles, it is preferred that the plurality of conductive particles has a distribution rate of at least 10 g/m2 in particular over at least one side edge, preferably at least 15 g/m2. It was experimentally found that such distribution rate provides sufficient coverage and is thus sufficient for efficient discharge of electrostatic poten-tial.

It is conceivable that at least conductive structure is provided on at least one side edge of the panel, and in particular the core layer, by means of printing, rotary print-ing, spraying, foil transfer and/or coating. Hence, at least one conductive structure can be applied onto at least one side edge. It is possible that said side edge(s) is provided with a primer prior to applying the conductive structure. A benefit of applying a conductive structure by means of printing, rotary printing, spraying, foil transfer and/or coating is that the conductive structure can substantially follow the shape of the side edge. Hence, in case there is a surface structure or surface pattern, the conductive structure may substantially form a coating layer over said surface structure or surface pattern.

In yet a further beneficial embodiment, at least one conductive structure is provided incorporated in a web, sheet or mesh form which is attached to at least one side edge. In this way the conductive material applied to form the conductive structure is relatively limited, whilst by using a the web, sheet or mesh form efficient pathways for the discharge of electrostatic potential can be created. In a preferred embodiment, at least one side edge of the core layer is at least partially covered or coated with a conductive material, in particular such that said conductive material at least extends between the conductive layer and the bottom core surface of the core layer thereby forming a conductive structure.

It is conceivable that at least one side edge of the core layer comprises multiple conductive structures, wherein preferably each conductive structure at least extends between the conductive layer and the bottom core surface of the core layer. Hence, an embodiment is conceivable where there are multiple connection region between the conductive layer and the multiple conductive structures. The conductive structures may for example be arranges substantially parallel. In case multiple conductive structures are applied as a single side edge, it is conceivable that at least part of the conductive structures are positioned at a distance from another.

The surface conductivity of at least one conductive layer is preferably at most $10^{-4}$ Ohm meter ($\Omega \cdot m$). It is also possible that at least part of the conductive layer has a surface conductivity of at most $10^{-4}$ $\Omega \cdot m$. At least part of the conductive layer may for example have a surface conductivity of at most $0.9*10^{-4}$ $\Omega \cdot m$, preferably $0.8*10^{-4}$ $\Omega \cdot m$, more preferably $0.75*10^{-4}$ $\Omega \cdot m$.

The panel typically comprises a top surface and a bottom surface. Likewise, the conductive layer typically comprises an upper surface and a bottom surface. The bottom surface of the conductive layer is typically attached to the upper core surface of the core layer. The decorative layer is preferably directly attached to an upper surface of the conductive layer. Hence, in this way, the decorative layer is close to the conductive layer resulting in the conductive layer being relatively close to the upper surface of the decorative layer, and thus to the top surface of the panel as such. It is preferred that the conductive layer is positioned within 0.7 mm from a top surface of the panel. It is also possible that the conductive layer is positioned within 0.6 or 0.5 mm from a top surface of the panel. The closer the conductive layer is to the top surface of the panel, or the upper surface of the decorative layer, the lower will be the electrostatic charge buildup at the decorative layer. The conductive layer according to the present invention could also be referred to as static conductive layer.

The thickness of decorative layer is preferably in the range of 0.1 to 0.7 mm. The decorative layer is preferably a thermoplastic layer. The capacitance of the floor formed by a plurality of panels according to the present invention can be reduced by limiting the thickness of the thermoplastic, decorative top layer, thereby lowering the maximum capacitance or charge carrying capacity of the floor. Hence, applying a relatively thin decorative layer, in particular in the range of 0.1 to 0.7 mm will have a beneficial effect to the capacitance of the panel and thus of the floor formed by a plurality of said panels. It was experimentally that the limited thickness of the thermoplastic structure between the conductive layer and the top surface of the decorative layer, or thus the thick of the decorative layer as such, allows the triboelectric discharge of the top surface of the panel to be less than 1000 V, in particular less than 500 V.

It is preferred that the conductive layer covers at least part of the upper core surface of the core layer. It is in particular preferred that the conductive layer covers at least 5% of the upper core surface of the core layer, more preferably at least 20% of the upper core surface of the core layer. It is also conceivable that the conductive layer substantially covers the upper core surface of the core layer. However, the conductive layer does not necessarily need to be a dense structured layer.

It is conceivable that the conductive layer is formed by a plurality of (interconnected) conductive particles provided on the upper core surface of the core layer. At least part of the conductive layer may be (directly) attached to the upper core surface of the core layer. In case the conductive layer is formed by a plurality of (interconnected) conductive particles provided on the upper core surface of the core layer it is beneficial if said interconnected particles extend between at least two opposite side edges. It is also conceivable that said interconnected particles at least connect at leas two opposite side edges of the core layer with another.

It is beneficial if the conductive particles form a predetermined pattern on the upper core surface of the core layer. At least part of the conductive particles may for example define a repeated pattern. Non-limiting examples of pattern which could be formed by the conductive particles are a cell structure and/or a plurality of cell units. The pattern may for example be a honeycomb pattern, a circular pattern, a rhombic pattern, a square pattern, a triangular pattern or a combination of these.

At least one conductive layer may comprise a composite material comprising at least one matrix material and a plurality of conductive particles. Preferably, the composite material comprises at least 5 wt % conductive particles, more preferably at least 15 wt % conductive particles and most preferably at least 25 wt % conductive particles. It is also conceivable that at least one conductive layer comprises a composite material comprising at least one matrix material and at least one conductive material, wherein the composite material preferably comprises at least 5 wt % conductive material, more preferably at least 15 wt % conductive material and most preferably at least 25 wt % conductive material. At least part of the conductive particles and/or at least part of the conductive material may comprise carbon, graphite and/or metal. It is for example conceivable that the conductive material applied is carbon powder. It is also conceivable that at least part of the conductive particles comprise amorphous carbon black. In case amorphous carbon black is applied, it is preferred that said material is produced from heavy petroleum or vegetable oil. The concentration or ratio of conductive particles in the composite material is preferably higher than the percolation threshold. The percolation threshold is the ratio or concentration at which the conductive particles start forming continuous conducting networks in the composite material. In the case of traditional conductive particles such as carbon black, the threshold is only achievable at a ratio of 10 to 50% by weight. Some conductive particles such as carbon nanotubes have a lower percolation threshold.

In case at least one conductive layer comprises a plurality of conductive particles, the plurality of conductive particles may have a distribution rate of at least 10 g/m2 in particular on the upper core surface of the core layer, preferably at least 15 g/m2. It is conceivable that the distribution rate of conductive particles of the conductive structure is higher than the distribution rate of conductive particles of the conductive layer.

At least one conductive layer may be provided on the upper core surface of the core layer by means of printing, rotary printing, spraying, foil transfer and/or coating. It is also conceivable that the conductive layer is provided on the upper core surface of the core layer by means of printing, rotary printing, spraying, foil transfer and/or coating. It is possible that a primer is applied prior to applying the conductive layer. A benefit of applying a conductive layer by means of printing, rotary printing, spraying, foil transfer and/or coating is that the conductive layer can be applied in an easy and efficient manner. It is also conceivable that at least one conductive structure and the conductive layer are applied during the same printing, rotary printing, spraying, foil transfer and/or coating step. This could result in a more uniform conductive configuration for the conductive layer and conductive structure(s). At least one conductive layer may also be a web, sheet or mesh. In this way the conductive material applied to form the conductive layer is relatively limited, whilst by using a the web, sheet or mesh efficient pathways for the discharge of electrostatic potential (towards the conductive structures) can be created. At least one conductive layer can for example be incorporated in a web, sheet and/or mesh.

In yet a different embodiment, the conductive layer forms integral part of the core layer. It is for said embodiment beneficial if the conductive layer forms integral part of the upper part of core layer. It is for example conceivable that a plurality of conductive particles is embedded in the upper part of the core layer. Alternatively a web, sheet or mesh of conductive material can be embedded in the upper part of the core layer. The body, or main volume, of the core layer is preferably substantially free of conductive material. This may prevent disturbance of an efficient discharge of electrostatic potential towards the conductive structure(s).

The decorative layer preferably comprises at least one décor layer and/or at least one finishing layer. At least one finishing laying can for example be a UV-cured coating, an electron-beam modified resin and/or an acrylic or polyurethane coating.

It is conceivable that at least one décor layer is attached to at least part of the conductive core layer and/or at least part of the core layer. It is also conceivable that the décor layer is a print layer. In a beneficial embodiment of the panel, at least part of the upper core surface of the core layer and/or at least part of the upper surface of the conductive layer is provided with at least one decorative pattern or decorative image. It is for example possible that such decorative image or pattern is provided via printing, for example via digital and/or inkjet printing. It is also possible that at least one decorative pattern is formed by relief provided in the upper core surface of the core layer or panel. A primer may be applied prior to applying the decorative pint. The decorative layer is preferably a thermoplastic layer. However, alternatively it would be possible that the décor layer comprises a plurality of impregnated layers containing lignocellulose but also a wood veneer, a veneer layer or the like and/or a combination of said materials. The decorative layer may for example comprise at least one resin impregnated cellulose-based ply and preferably multiple resin impregnated cellulose-based plies. Said cellulose-based ply may for example be paper, in particular kraft paper. The veneer layer is preferably selected from the group comprising of wood veneer, cork veneer, bamboo veneer, and the like. Other materials such as a rubber veneer, a decorative plastic or vinyl, linoleum, and laminated decorative thermoplastic material in the form of foil or film would be conceivable. The thermoplastic material can be PP, PET, PVC and the like. The design of the decorative layer can be chosen from a design database which includes digitally processed designs, traditional patterns, pictures or image files, customized digital artworks, randomized image pattern, abstract art, wood-patterned images, ceramic or concrete style images, or user-defined patterns. The designs can be printed or reproduced using laser printers, inkjet printers, or any other digital printing means including the conventional printing methods. Various types of inks can also be used to suit the design needs of the décor layer. Preferably, the ink used during the printing method comprises properties such as but is not limited to waterproofness, lightfastness, acid-free, metallic, glossy, sheen, shimmering, or deep black, among others. It is desirable that the decorative layer is visually exposed by a substantially transparent coating layer. The décor layer may comprise a pattern, wherein the pattern is printed via digital printing, inkjet printing, rotogravure printing machine, electronic line shaft (ELS) rotogravure printing machine, automatic plastic printing machine, offset printing, flexography, or rotary printing press. The decorative layer may also comprise at least one thermoplastic wear layer and/or at least one thermoplastic film layer. The wear layer, if applied, may have a thickness in the range of 0.2 to 0.8 mm, preferably in the range of 0.4 to 0.6 mm.

The panel, and in particular the core layer may comprise a composite material. The core layer may for example be a composite core layer. The core layer may for example comprise a filler and at least one binder. The binder can be selected from, but is not limited to, thermoplastic or thermoset resins including but not limited to vinyl, polyvinyl chloride (PVC), polyethylene (PE), polyurethane (PU), acrylonitrile butadiene styrene (ABS), melamine, and/or polypropylene (PP). Preferably, the ratio of weight percentages of filler relative to binder is at least 1:1, more preferably at least 2:1, most preferably at least 3:1. The filler material used in the core layer can comprise organic or inorganic materials which includes but is not limited to cellulose materials, fibrous materials, kraft paper, saw dusts, wood dusts, wood fibers, long wood fibers, short wood fibers, sand, lime, volcanic ash, plants-based fibers such as mushroom fibers, cotton fibers, bamboo fibers, abaca fibers, pineapple fibers, magnesium compounds, magnesium oxide, magnesium carbonate, limestone, polymeric fibers, glass fibers, carbon-based fibers, polymeric pellets, or hollow microspheres or particles having size ranging from 1 to 1000 micrometers made of but is not limited to ceramics, glass, polymers, composites, or metals. In a preferred embodiment the core layer can comprise at least one additive material, advantageously including surface active substances (surface active substances, SAS), such as methyl cellulose, "Badimol" plasticizing materials and other cationic active SAS, to improve the rheology of the mixture. The core layer may also include bentonite, which is a finely ground natural product suitable for increasing the rheological and waterproof properties of the panel itself. In yet a further preferred embodiment, the core layer is substantially free of conductive particles. The composite material of the core layer can be substantially free of conductive particles and/or conductive material.

It is conceivable that at least one core layer, if applied, comprises a composite material, in particular a mineral composite material. The core layer may for example comprise a magnesium oxide or MgO-based composite. The core layer may for example comprise MgCl2 and/or MgSO4. The composite core layer may for example comprise at least 20% by weight of magnesium oxide. A non-limiting example of a possible composite core layer, is a core layer comprising 30 to 40% by weight magnesium oxide, 10 to 20% by weight magnesium chloride or magnesium sulfate, 10 to 15% by weight water, 5 to 10% by weight magnesium hydroxide, 5 to 10% by weight calcium carbonate, 5 to 50% by weight lignocellulose (e.g. wood fibers or cork) and/or 10-15% by weight additives. It is found that a composite core layer, in particular a mineral composite core layer, has a good stability to heat which is also beneficial for the panel as such. The density of at least one core layer is preferably between 1200 and 2000 kg/m3, more preferably between 1400 and 1600 kg/m3. However, it is also conceivable that the density of at least one core layer is about 2000 kg/m3. The latter is for example possible when the core layer comprises an thermoplastic mineral composite. The mineral material can be selected from the group of magnesium oxide, magnesium carbonate, magnesium oxysulfate, magnesium oxychloride cement (MOC), magnesium chloride (MgCl2), magnesium sulfate (MgSO4), Sorel cement, fiber cement, MOS cement, limestone, calcium carbonate, calcite mineral, stone, chalk, clay, calcium silicate and/or talc. In some embodiments, the mineral material is preferably present as particulate mineral filler of at least 200 mesh, preferably more than 300 mesh. The thermoplastic mineral composite core layer may for example comprise 60 to 70% by weight of calcium carbonate, 20 to 25% by weight of polyvinyl chloride and possibly 5 to 10% by weight of additives. At least one core layer may comprise a density gradient, for example wherein the density near the upper surface is higher than the density near the bottom surface, or wherein the density near the upper surface and the bottom surface is higher than the density of a central region situated between said upper surface and bottom surface. A further non-limiting example of a possible core layer is an HDF based core layer comprising cellulose and a thermosetting resin. It is also conceivable that the core is a wood-based core comprising cellulose and/or a geopolymer based on magnesium oxide. The core can also be a foamed core. The panel and/or the core is preferably waterproof.

The core layer may for example have a thickness of at least 4 mm. It is for example possible that the thickness of the core layer is between 3 and 9 mm, preferably between 4 mm and 5.5 mm or between 5.5 mm and 7 mm. It is conceivable that at least one core layer comprises at least one reinforcing layer. The reinforcing layer can for example be a reinforcing mesh. Possibly, the core comprises at least two reinforcing layers, wherein a first reinforcing layer is located near the upper surface and wherein a further reinforcing layer is located near the bottom surface. Preferably, at least one reinforcing layer comprises a mesh or web, preferably comprising fiberglass, jute and/or cotton.

The panel may comprise at least one further layer, such as but not limited to a backing layer. In case a backing layer is applied, the backing layer can be adhered on the bottom core surface of the core layer via an adhesive. The backing layer is preferably made of a polymer material, for example but not limited to polyurethane. The backing layer may also be a sound absorbing layer. Such sound absorbing backing layer may further contribute to the good acoustic properties of the panel. Such backing layer may also be referred to as an acoustic layer. The backing layer may be composed of a foamed layer, preferably a low-density foamed layer, of ethylene-vinyl acetate (EVA), irradiation-crosslinked polyethylene (IXPE), expanded polypropylene (XPP) and/or expanded polystyrene (XPS). However, it is also conceivable that the backing layer comprises nonwoven fibers such as natural fibers like hemp or cork, and/or recycled/recyclable material such as PET. The backing layer, if applied, preferably has a density between 65 kg/m3 and 300 kg/m3, most preferably between 80 kg/m3 and 150 kg/m3. It is also conceivable that the panel comprises at least one adhesive layer on the bottom surface of the core layer, or the backing layer if applied. Said glue layer may be a conductive adhesive layer or a conductive glue layer.

A non-limiting practical example of a panel according to the present is a decorative panel, comprising a core layer comprising a limestone-filled PVC composition in particular of 4 mm thickness, a PVC-based decorative layer in particular of 0.07 mm thickness, a PVC transparent wear layer in particular of 0.5 mm and a polyurethane coating finish; at least one conductive layer which is at least partially enclosed between the core layer and the decorative layer and which comprises a honeycomb-shaped conductive print provided on an upper core surface of the core with a honeycomb cell diameter of 1 cm and comprising conductive particles comprising more than 90% graphite powder in particular with a resistance value of less than $10^{-4}$ Ohm meter; and wherein two opposite side edges of the core layer comprise a (vertically oriented) conductive structure, in particular a printed conductive structure, which extends between the conductive layer and the bottom core surface of the core layer and which comprises more than 90% graphite powder in particular with a resistance value of less than $10^{-4}$ Ohm meter. The above described composition is shown experimentally to have an electrostatic charge buildup of less than 0.2 kV when tested according to EN 1815 and a static decay of less than 0.03 sec when tested according to SJ/T 10694/2006.

The invention also relates to an assembly of at least one panel according to the present invention and at least one grounding system. Said grounding system can be any of the conventional grounding systems according to the prior art.

The invention further relates to a covering, in particular a floor covering comprising multiple decorative panels according to the present invention.

The invention also relates to a method of manufacturing a decorative panel, in particular a floor panel, preferably according to the present invention, comprising the steps of providing at least one core layer, the core layer comprising an upper core surface and a bottom core surface and at least two pairs of opposing side edges, providing at least one conductive layer upon the upper core surface of the core layer, providing at least one decorative layer upon at least part of the conductive layer such that the conductive layer is at least partially enclosed between the core layer and the decorative layer, and providing at least part of at least one side edge of the core layer with at least one conductive structure which at least extends between the conductive layer and the bottom core surface of the core layer.

The method is in particular configured to manufacture a panel according to any of the embodiments according to the present invention. Any of the above described embodiments of the core layer, conductive layer, decorative layer and/or decorative structure can be applied in relation to the method according to the present invention. The method may include the step of providing at least one pair of opposite side edges, and preferably each pair of opposite side edges, with complementary coupling parts. The surface conductivity of at least one conductive structure is preferably at most $10^{-4}$ Ohm meter and/or the surface conductivity of at least one conductive layer is preferably at most $10^{-4}$ Ohm meter. It is conceivable that at least one conductive structure is provided such that it covers at least part of the surface of at least one side edge of the core layer. It possible that at least one conductive structure is connected with the conductive layer. Preferably, at least conductive structure is provided on at least one side edge of the core layer by means of printing, rotary printing, spraying, foil transfer and/or coating. Also at least one conductive layer is preferably provided on the upper core surface of the core layer by means of printing, rotary printing, spraying, foil transfer and/or coating. The decorative layer can be directly attached to an upper surface of the conductive layer. It is preferred that the conductive layer is positioned within 0.7 mm from a top surface of the panel.

The method steps according to the present invention are in principle not limited to a predefined order. However, the method steps may be subsequent method steps. The at least one conductive layer is typically provided prior to the decorative layer being provided. It is conceivable that at least one conductive structure is provided subsequently. However, it is also conceivable that at least one conductive structure is provided during the same step as the provision of the conductive layer. The provision of the conductive layer and the conductive structure(s) may also be subsequent steps. The decorative layer can thereafter be attached to the conductive layer. It is also possible that at least one conductive layer and at least one decorative layer are provided upon the upper core surface of the core layer and that the core layer is then provided with at least one pair of opposite side edges wherein in particular each pair of opposite side edges is provided with complementary coupling parts. At least one conductive structure can subsequently be provided upon at least one side edge and in particular upon at least part of at least one coupling part.

The invention will be further elucidated via the following non-limitative clauses.

1. Decorative panel, in particular a floor panel, the panel comprising:
    at least one core layer, the core layer comprising an upper core surface and a bottom core surface and at least two pairs of opposing side edges;
    at least one decorative layer; and
    at least one conductive layer, wherein the conductive layer is at least partially enclosed between the core layer and the decorative layer;
    wherein at least part of at least one side edge of the core layer comprises at least one conductive structure which at least extends between the conductive layer and the bottom core surface of the core layer.

2. Panel according to clause 1, wherein at least one pair of opposite side edges, and preferably each pair of opposite side edges, is provided with complementary coupling parts.

3. Panel according to any of the previous clauses, wherein the surface conductivity of at least one conductive structure is at most 10^-4 Ohm meter.

4. Panel according to any of the previous clauses, wherein at least one conductive structure covers at least part of the surface of at least one side edge of the core layer.

5. Panel according to any of the previous clauses, wherein at least one conductive structure is connected with the conductive layer.

6. Panel according to any of the previous clauses, wherein at least part of the conductive structure is formed by a plurality of conductive particles which are attached to at least one side edge.

7. Panel according to any of the previous clauses, wherein at least one conductive structure comprises a composite material comprising at least one matrix material and a plurality of conductive particles, wherein the composite material comprises at least 5 wt %, preferably at least 15 wt %, more preferably at least 25 wt % conductive particles.

8. Panel according to clause 7, wherein at least part of the conductive particles comprise carbon, graphite and/or metal.

9. Panel according to clause 7 or 8, wherein the plurality of conductive particles has a distribution rate of at least 10 g/m2.

10. Panel according to any of the previous clauses, wherein at least conductive structure is provided on at least one side edge of the core layer by means of printing, rotary printing, spraying, foil transfer and/or coating.

11. Panel according to any of the previous clauses, wherein at least conductive structure is provided incorporated in a web, sheet or mesh form which is attached to at least one side edge.

12. Panel according to any of the previous clauses, wherein at least one side edge of the core layer comprises multiple conductive structures, wherein each conductive structure at least extends between the conductive layer and the bottom core surface of the core layer.

13. Panel according to any of the previous clauses, wherein at least one side edge is at least partially covered with a conductive material wherein said conductive material at least extends between the conductive layer and the bottom core surface of the core layer thereby forming a conductive structure.

14. Panel according to any of the previous clauses, wherein the surface conductivity of at least one conductive layer is at most 10^-4 Ohm meter.

15. Panel according to any of the previous clauses, wherein the decorative layer is directly attached to an upper surface of the conductive layer.

16. Panel according to any of the previous clauses, wherein the conductive layer is positioned within 0.7 mm from a top surface of the panel.

17. Panel according to any of the previous clauses, wherein the conductive layer covers at least part of the upper core surface of the core layer, preferably wherein the conductive layer covers at least 5% of the upper core surface of the core layer, more preferably at least 20% of the upper core surface of the core layer.

18. Panel according to any of the previous clauses, wherein the conductive layer is formed by a plurality of conductive particles provided on the upper core surface of the core layer.

19. Panel according to clause 18, wherein the conductive particles form a predetermined pattern on the upper core surface of the core layer.

20. Panel according to clause 18 or 19, wherein at least part of the conductive particles define a repeated pattern.

21. Panel according to any of clauses 18 to 20, wherein at least part of the conductive particles comprises carbon, graphite and/or metal.

22. Panel according to any of clauses 18 to 21, wherein the plurality of conductive particles has a distribution rate of at least 10 g/m2 on the upper core surface of the core layer.

23. Panel according to any of the previous clauses, wherein at least one conductive layer is provided on the upper core surface of the core layer by means of printing, rotary printing, spraying, foil transfer and/or coating.

24. Panel according to any of the previous clauses, wherein at least one conductive layer is incorporated in a web, sheet and/or mesh.

25. Panel according to any of the previous clauses, wherein the conductive layer forms integral part of the core layer.

26. Panel according to any of the previous clauses, wherein the decorative layer comprises at least one décor layer and at least one finishing layer.

27. Panel according to any of the previous clauses, wherein the decorative layer comprises at least one resin impregnated cellulose-based ply.

28. Panel according to any of the previous clauses, wherein the core layer is a composite core layer.

29. Assembly of at least one panel according to any of clauses 1 to 28 and at least one grounding system.

30. Method of manufacturing a decorative panel, in particular a floor panel, preferably according to any of clauses 1 to 28, comprising the steps of:

providing at least one core layer, the core layer comprising an upper core surface and a bottom core surface and at least two pairs of opposing side edges;

providing at least one conductive layer upon the upper core surface of the core layer;

and providing at least one decorative layer upon at least part of the conductive layer such that the conductive layer is at least partially enclosed between the core layer and the decorative layer; and providing at least part of at least one side edge of the core layer with at least one conductive structure which at least extends between the conductive layer and the bottom core surface of the core layer.

31. Method according to clause 30, wherein the surface conductivity of at least one conductive structure is at most 10^-4 Ohm meter and/or wherein the surface conductivity of at least one conductive layer is at most 10^-4 Ohm meter.

32. Method according to clause 30 or 31, wherein at least one conductive structure is provided on at least one side edge of the core layer by means of printing, rotary printing, spraying, foil transfer and/or coating, and/or wherein at least one conductive layer is provided on the upper core surface of the core layer by means of printing, rotary printing, spraying, foil transfer and/or coating.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. A decorative panel, the panel comprising:
at least one core layer, the at least one core layer comprising an upper core surface and a bottom core surface and at least two pairs of opposing side edges;
at least one thermoplastic decorative layer; and
at least one conductive layer, wherein the at least one conductive layer is at least partially enclosed between the at least one core layer and the at least one thermoplastic decorative layer and wherein the at least one conductive layer is positioned within 0.7 mm from a top surface of the panel;
wherein at least part of at least one side edge of the at least one core layer comprises at least one conductive structure which at least extends between the at least one conductive layer and the bottom core surface of the at least one core layer.

2. The panel according to claim 1, wherein the at least one pair of opposite side edges is provided with complementary coupling parts.

3. The panel according to claim 1, wherein the surface conductivity of the at least one conductive structure and/or of the at least one conductive layer is at most 10-4 Ohm meter.

4. The panel according to claim 1, wherein the at least one conductive structure covers at least part of the surface of at least one side edge of the core layer.

5. The panel according to claim 1, wherein the at least one conductive structure is connected with the at least one conductive layer.

6. The panel according to claim 1, wherein at least part of the at least one conductive structure is formed by a plurality of conductive particles which are attached to at least one side edge.

7. The panel according to claim 1, wherein the at least one conductive structure comprises a composite material comprising at least one matrix material and a plurality of conductive particles, wherein the composite material comprises at least 5 wt % conductive particles.

8. The panel according to claim 7, wherein at least part of the conductive particles comprise carbon, graphite and/or metal.

9. The panel according to claim 7, wherein the plurality of conductive particles has a distribution rate of at least 10 g/m2.

10. The panel according to claim 1, wherein the at least one conductive structure is incorporated in a web, sheet, and/or mesh form which is attached to at least one side edge and/or wherein the at least one conductive layer is incorporated in a web, sheet, and/or mesh.

11. The panel according to claim 1, wherein at least one side edge of the core layer comprises multiple conductive structures, wherein each conductive structure at least extends between the at least one conductive layer and the bottom core surface of the core layer.

12. The panel according to claim 1, wherein the decorative layer is directly attached to an upper surface of the at least one at least one conductive layer.

13. The panel according to claim 1, wherein the at least one conductive layer covers at least 20% of the upper core surface of the core layer.

14. The panel according to claim 1, wherein the at least one conductive layer is formed by a plurality of conductive particles provided on the upper core surface of the core layer.

15. The panel according to claim 12, wherein at least part of the conductive particles comprises carbon, graphite and/ or metal, and/or wherein the plurality of conductive particles has a distribution rate of at least 10 g/m2 on the upper core surface of the core layer.

16. The panel according to claim 1, wherein the at least one conductive layer forms an integral part of the core layer.

17. A method of manufacturing a decorative panel, comprising the steps of:

provided at least one core layer, the at least one core layer comprising an upper core surface and a bottom core surface and at least two pairs of opposing side edges;

providing at least one conductive layer upon the upper core surface of the at least one core layer;

and providing at least one decorative layer upon at least part of the at least one conductive layer such that the at least one conductive layer is at least partially enclosed between the at least one core layer and the at least one thermoplastic decorative layer and wherein the conductive layer is positioned within 0.7 mm from a top surface of the panel; and provided at least part of the at least one side edge of the at least one core layer with the at least one conductive structure which at least extends between the at least one conductive layer and the bottom core surface of the at least one core layer.

18. The method according to claim 17, wherein the surface conductivity of the at least one conductive structure is at most $10^{-4}$ Ohm meter and/or wherein the surface conductivity of the at least one conductive layer is at most $10^{-4}$ Ohm meter.

19. The method according to claim 17, wherein the at least one conductive structure is provided on at least one side edge of the core layer by means of printing, rotary printing, spraying, foil transfer and/or coating, and/or wherein at least one conductive layer is provided on the upper core surface of the core layer by means of printing, rotary printing, spraying, foil transfer and/or coating.

20. The panel according to claim 1, wherein the at least one thermoplastic decorative layer has an upper surface free of conductive material.

\* \* \* \* \*